INVENTOR
KENNETH E. PERRY

BY Rines and Rines

ATTORNEYS

INVENTOR
KENNETH E. PERRY

BY Rines and Rines

ATTORNEYS 3,439,338
POWER, SYNCHRONIZING AND TIMING WAVEFORM GENERATOR AND APPARATUS

Kenneth E. Perry, Wayland, Mass., assignor, by mesne assignments, to EG & G International, Inc., Bedford, Mass., a corporation of Delaware Filed Jan. 12, 1966, Ser. No. 520,203
Int. Cl. H04g *1/18;* H04m *11/04*
U.S. Cl. 340—147 7 Claims

ABSTRACT OF THE DISCLOSURE

A system for remote control over distribution transmission lines is disclosed. Periodic time variations in signals of special waveform provide synchronization and timing at the remote station.

The present invention relates to power, synchronizing and timing apparatus, being more particularly directed to the generation of alternating-current energy for transmission along distribution transmission lines such as, for example, underwater cables connected with pluralities of measuring or other instruments and equipment, or other electrical distribution systems and the like.

Numerous types of synchronizing and power current or voltage generators have been used to transmit energy suitable for operating electrical and electronic apparatus and for insuring the proper synchronization or timing of such operation. Such synchronization has been attained with the aid of periodic synchronizing signals that are distinct from the signals being transmitted in amplitude, frequency or phase. In certain applications, however, as in transmission along underwater cables associated with electrical instruments distributed therealong, and similar systems, the signal amplitude may vary along the cable in an unknown manner due to unpredictable underwater attenuation and other losses, rendering the use of amplitude-variation synchronization unreliable. Frequency or phase modulations or changes for purposes of providing a synchronizing signal are similarly subject to disadvantages residing in the requirement for channel separation filters and other complex and costly equipment.

In accordance with the present invention, therefore, in summary, synchronization and timing are effected by periodic time variations in a train of signals of special waveforms and other characteristics particularly suited to the unusual problems of the power, synchronization and timing requirements of cable-fed and supported underwater instruments and similar systems.

A further object of the invention is to provide a novel power, synchronization and timing system of more general utility, also.

Other and further objects will be pointed hereinafter and will be more particularly set forth in the appended claims.

Figure 1:
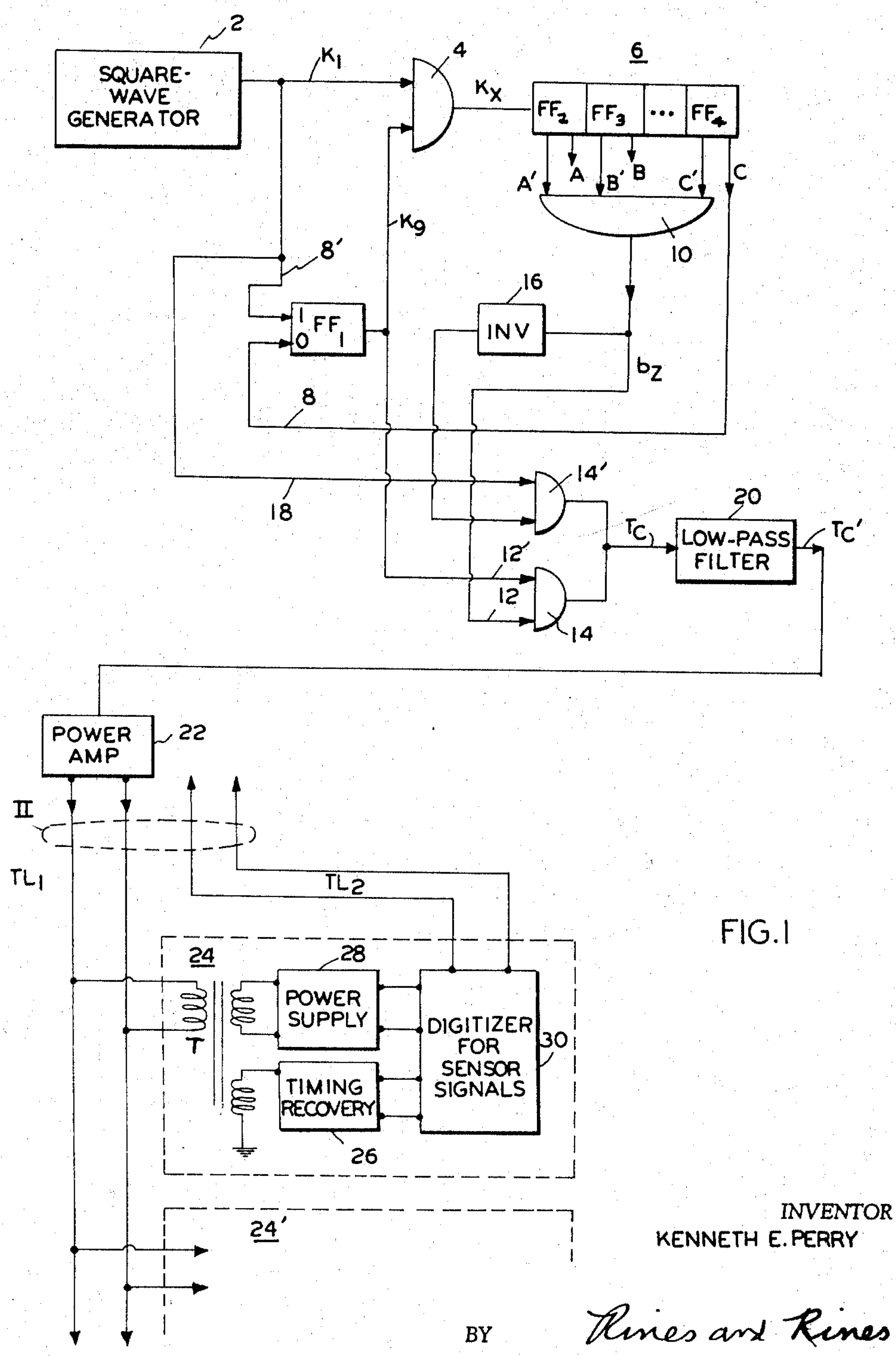
Figures 2A, 2B, 2C, 2D, 2E, 2F, 2G, 2H, 2I:
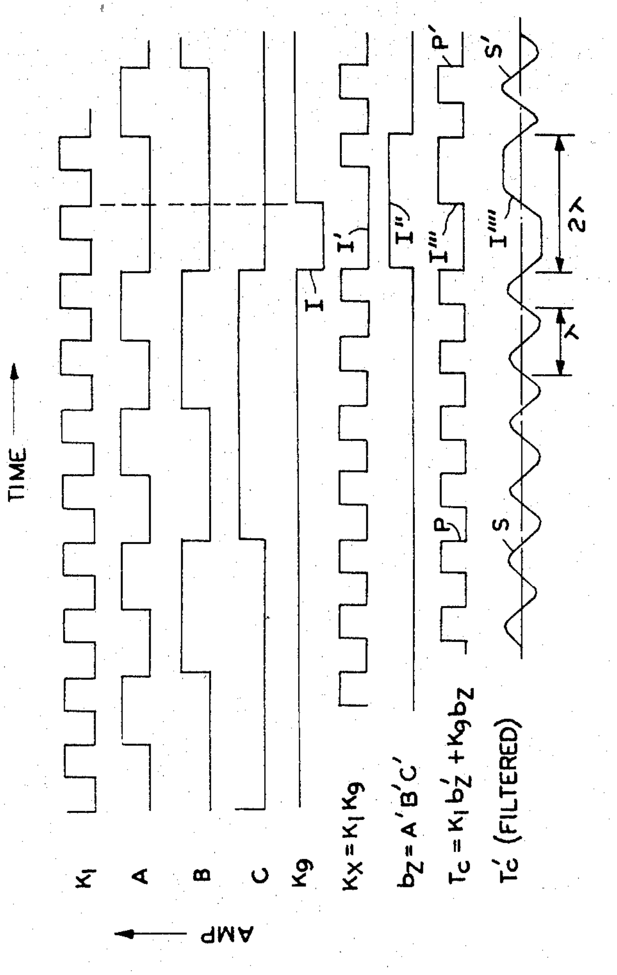
Figure 3:
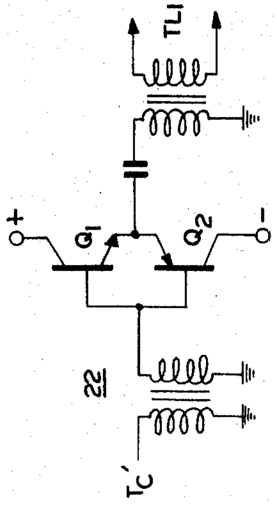

The invention will now be described in connection with the illustrative example of such underwater systems with reference to the accompanying drawings, FIG. 1 of which is a combined schematic and block diagram of a preferred embodiment;

FIGS. 2A and 2I are explanatory amplitude versus time graphs illustrating the waveforms at various portions of the circuit of FIG. 1; and FIG. 3 is a schematic circuit diagram of a preferred power amplifier for use in the system of FIG. 1.

Referring to FIG. 1, a square wave generator of any conventional form is shown at 2 applying its output at K (the train of impulses of FIG. 2A), to one input of an "and" gate 4, the other input $K_9$ of which is applied from a later-described first flip-flop stage $FF_1$. The pulses may, for example, be of sixty cycle frequency or any other desired frequency. The output of gate 4 is applied at $K_x$ to a counter 6, shown for illustrative purposes as having successive flip-flop stages $FF_2$, $FF_3$ . . . $FF_4$, the respective outputs of which are derived at A–A′, B–B′, . . . C–C′. The output C of counter flip-flop $FF_4$ is applied at 8 to the "0" input of the first-mentioned flip-flop $FF_1$, and the output $K_1$ of the square-wave generator 2 is applied at 8′ to the "1" input of $FF_1$. The successively divided outputs at A, B and C of respective counter flip-flop stages $FF_2$, $FF_3$ . . . $FF_4$ are respectively shown in waveforms FIGS. 2B, 2C and 2D, such that after a predetermined number of impulses are counted from the generator 2, FIG. 2A, the flip-flop $FF_1$ is caused to generate the impulse I of FIG. 2E which, as before stated, is applied to the gate 4 together with the signal train of square wave impulses at $K_1$. There thus results at the output $K_x$ of gate 4, the waveform of FIG. 2F, having a distinctive wider pulse at I′ which, in this illustrative example, is three times the width of each negative pulse of FIG. 2A.

The complementary outputs A′, B′ and C′ of counter flip-flops $FF_2$, $FF_3$ and $FF_4$ are shown fed to gate 10, the output $b_z$ of which has the waveform of FIG. 2G; namely, a positive pulse I″ four times the width of each positive or negative pulse of the original train of FIG. 2A or twice the width of each combined positive and negative pulse cycle of FIG. 2A. The output $b_z$ is applied at 12 to a further gate 14 to which is also fed, at 12′, the output $K_9$ (FIG. 2E) from flip-flop $FF_1$. The output $b_z$ is also fed to an inverter 16 and thence to a similar gate 14′ also energized by the original impulse train of FIG. 2A from output $K_1$ via conductor 18. The combined output $T_c$ of gates 14 and 14′ has the waveform of FIG. 2H, providing a positive-negative square-wave cycle I‴ of twice the period (or half the frequency) of the preceding and following trains P and P′ of square-wave impulses.

In accordance with a preferred embodiment of the invention, the square-wave trains P and P′ preceding and following the double-period cycle I‴ in the output $T_c$ are rendered substantially sinusoidal substantially to eliminate higher harmonics that not only introduce substantial cross-talk when transmitted along, for example, underwater cable II for the purposes before discussed, but introduce ringing effects as well. These substantially cross-talk-free and ringing-free results could not be obtained with the higher-harmonic-containing square-wave impulses of FIG. 2H. This conversion to the substantially sinosoidal narrow-band waveforms at S and S′, FIG. 2I, is effected with a low-pass filter 20, substantially eliminating harmonic frequencies above, say, the third harmonic of the fundamental frequency of the waveform S, and preferably attenuating such third harmonic as well. The double period or double wave-length cycle (2λ) shown at I″″, FIG. 2I, will, however, be considerably flat-topped, as shown, for advantageous reasons later explained. It is of course to be understood that the particular waveform produced at $T_c'$ is periodically repeated, having similar substantially sinusoidal alternating current waveform trains S, S′ of predetermined amplitude and predetermined wavelength λ, each interconnected by a substantially flat-topped cycle I″″ (or plural flat-topped impulses, all generically herein termed "cycle"), of substantially the said peak amplitude but twice the wavelength (or, if desired other multiples than two), substantially symmetrical with respect to the zero current time axis shown as a horizontal dotted axis in FIG. 2I.

Through the use of this special waveform current at $T_c'$, a combined power, synchronization and timing signal is provided for transmission, preferably after amplification at 22, along transmission lines $TL_1$, associated with the cable II. At various locations along the cable II, instruments or other electrical apparatus, such as the elements 24 and 24', are coupled to the line TL, and supported in well known manner from the cable. In view of the nature of the waveform of FIG. 2I, this coupling may be inductive, as through transformer T of instrument 24, or of any other type including direct coupling. The distinctive cycles I'''' may be used for timing and synchronizing purposes (controlled, for example, by the zero crossing of the positive portion of I'''') by the synchronizing input 26 of the instrument or other device 24. If the instrument embodies one or more sensors (for detecting such underwater phenomena, for example, as water current, speed and direction, temperature or pressure and the like), the sensed signals may be digitized at 30, as is well known, and transmitted back up the cable II via line $TL_2$, at times determined by such synchronizing. The same waveform of FIG. 2I, moreover, supplies current for rectification in the instrument power supply 28 to operate the instrument circuits and apparatus.

Improved power amplification efficiency may be obtained through the flat-topped waveform above-discussed, with a power amplifier circuit 22 of the type shown in FIG. 3, embodying a complementary pair of emitter-follower power transistor relays $Q_1$ and $Q_2$. Such transistors then operate most of the time in saturation conduction with little voltage drop, so that little dissipation occurs and improved efficiency results.

What is claimed is:

1. Electrical apparatus having, in combination, transmission-line means, instrument means disposed along and coupled to the transmission-line means and containing power-supply means and timing means for synchronizing and timing the operation of the instrument means, means for generating similar trains of substantially sinusoidal waveform current of predetermined wavelength and peak amplitude each interconnected by a substantially flat-topped cycle of substantially the said peak amplitude but a multiple of the said predetermined wavelength, the said waveform being substantially symmetrical with respect to a zero current time axis in order that the zero crossings of the waveform may be employed as timing signals with the zero crossings of the said flat-topped cycle serving as synchronizing signals, and means for transmitting the generated waveform current along the transmission-line means to provide current for the said power-supply means and timing and synchronizing signals for the said timing means.

2. Apparatus as claimed in claim 1 and in which the instrument means and the transmission-line means are inductively coupled together to apply the said current.

3. Apparatus as claimed in claim 1 and in which the said multiple is two.

4. Apparatus as claimed in claim 1 and in which the transmission-line means comprises an underwater cable and the said instrument means comprises underwater sensing apparatus the operation of which is timed by said synchronizing signals.

5. Apparatus as claimed in claim 1 and in which the said waveform current is amplified prior to its transmission along the transmission-line means by a complementarily operated switching relay amplifier.

6. Apparatus as claimed in claim 1 and in which the generating means comprises square-wave generating means for producing similar successive pulses, means for dividing the pulses into trains connected by further pulses of width that is the said multiple of the width of the first-named pulses, and means for converting the said trains of pulses into substantially sinusoidal waveform while maintaining substantially flat-topped waveforms for the said further pulses.

7. Apparatus as claimed in claim 6 and in which the said dividing means comprises interconnected counter and gate means and the said converting means comprises low-pass filter means.

References Cited

UNITED STATES PATENTS 3,214,733 10/1965 Spencer et al. ________ 340—147

JOHN W. CALDWELL, *Primary Examiner.*

HAROLD I. PITTS, *Assistant Examiner.*

U.S. Cl. X.R.

340—151, 310